United States Patent [19]

Conners

[11] Patent Number: 4,964,449

[45] Date of Patent: Oct. 23, 1990

[54] MITER SAW TRACK

[76] Inventor: John M. Conners, 2741 NW. 22, Oklahoma City, Okla. 73107

[21] Appl. No.: 499,748

[22] Filed: Mar. 27, 1990

[51] Int. Cl.$^5$ ............................................. B25H 1/00
[52] U.S. Cl. .............................. 144/286 R; 83/477.1; 269/290; 269/296; 144/287
[58] Field of Search ....................... 83/574, 701, 477.1; 269/290, 296; 144/1 R, 3 R, 286 R, 287

[56] References Cited

U.S. PATENT DOCUMENTS

| | | | |
|---|---|---|---|
| 4,007,657 | 2/1977 | Burch | 83/477.1 |
| 4,105,055 | 8/1978 | Brenta | 144/286 |
| 4,527,605 | 7/1985 | Ede et al. | 144/286 R |
| 4,890,657 | 1/1990 | Shelhonse | 144/286 R |

Primary Examiner—W. Donald Bray
Attorney, Agent, or Firm—Robert K. Rhea

[57] ABSTRACT

An elongated in-the-field relatively long workpiece supporting frame provided with a wood working tool is formed by a pair of upright end frames, horizontally supporting a pair of tracks therebetween.

The tracks in turn support a carriage movable along the tracks toward or away from either of the end frames.

A workpiece extending between the work frames is supported by horizontal panel members on the frames while the workpiece lies on the work table of the wood working tool.

3 Claims, 1 Drawing Sheet

MITER SAW TRACK

BACKGROUND OF THE INVENTION

1. Field of the Invention

This invention relates to a frame intended primarily for wood working and more particularly to a light weight portable frame, suitable for supporting elongated dimension lumber for wood working operations at an on-the-job location.

2. Description of the Prior Art

Prior patents generally disclose bench frames disposed in a wood working establishment featuring a horizontal support platform for supporting relatively large lumber panels. Some of these bench frames permit the use of a plurality of tools. For example, a cantilever beam mounted over a table top and at one side thereof for supporting any one of a plurality of different tools for movement longitudinally along the beam and working on the wood piece. These bench frames are not capable of supporting relatively long dimension lumber such as a 2×4 at an on-the-job location for processing on wood workpieces.

U.S. Pat. No. 4,105,055 discloses a portable kit comprising a leg mounted horizontal open frame, supporting a pair of tool guiding tracks mounted in parallel spaced relation at one side of the frame. One of the tracks being movable toward and away from the other for supporting relatively small tools, such as a router or miter saw or, when the tracks are separated, supporting the frame of a table saw. The tracks permit adjusting or adjustable movement or positioning of the respective tool along the tracks over the area of the wood piece supporting frame.

However, the device disclosed by this patent is not believed to be capable, in its illustrated and described form of supporting relatively long workpieces for use at a job location.

This invention accomplishes the purpose of supporting a wood working tool in movable relation relative to a pair of tracks extending in depending relation between end portions of a relatively long workpiece.

SUMMARY OF THE INVENTION

A manually movable relatively long workpiece supporting frame is formed by a pair of upright open frames horizontally supporting respective end portions of parallel spaced apart tracks.

A workpiece rest is horizontally disposed on the respective end frame for supporting respective end portions of elongated dimension lumber such as 2×4s, 2×6s, etc.

A carriage defined by a horizontal support platform is provided with a plurality of rollers guided and supported by the parallel frame tracks for to and fro movement between the track supporting end frames.

A wood working tool such as a miter saw is mounted on the carriage platform with its work table lying in a plane common to the plane defined by the frame workpiece rests. With the frame workpiece rests supporting an elongated workpiece, the miter saw and carriage may be moved relative to the frame and workpiece to a desired position for conventional operation of the miter saw on the workpiece.

The principal object of the present invention is to provide a portable workpiece supporting frame for performing wood working operations on relatively long workpieces.

Another object of this invention is to provide a workpiece supporting frame which is easily transportable manually and is relatively economical to produce and therefore is available for use by small professional wood workers and individual contractors.

DESCRIPTION OF THE PREFERRED EMBODIMENTS

Figure 1:
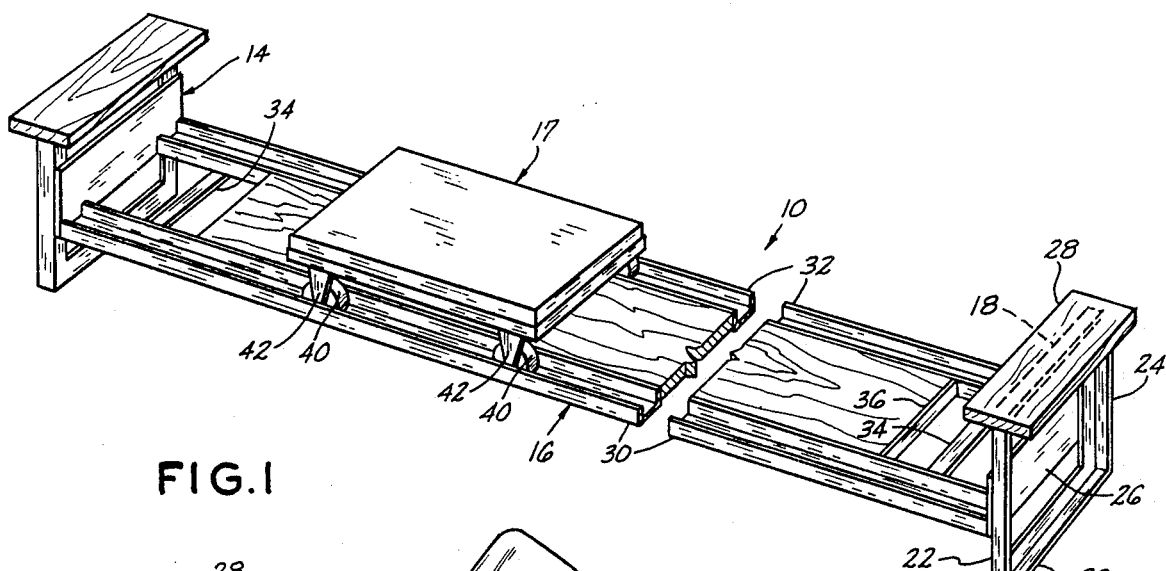
FIG. 1 is a fragmentary perspective view of the workpiece supporting frame, per se; and, FIG. 2 is a fragmentary perspective view, similar to FIG. 1, illustrating the workpiece supporting frame supporting a workpiece and a miter saw mounted on the carriage.

Like characters of reference designate like parts in those figures of the drawings in which they occur.

In the drawings:

Referring first to FIG. 1 the reference numeral 10 indicates the device per se, comprising a pair of parallel spaced apart rectangular upright open frames 12 and 14 horizontally supporting a track means 16 therebetween and having a carriage means 17 thereon. The frame means 12 and 14 preferably being formed from right angle members for rigidity.

Since the frames means 12 and 14 are identical, in the interest of brevity, only the frame means 12 is described in detail.

The frame means 12 comprises upper and lower spaced apart horizontal top and bottom members 18 and 20 respectively. The top and bottom members are interconnected at their respective ends by a pair of upright side pieces 22 and 24.

A rectangular panel 26 extends horizontally between the side pieces 22 and 24 intermediate their height and on that side facing the opposite frame means.

A workpiece rest 28 horizontally overlies and is secured to the top frame member 18 for supporting a workpiece, as presently explained.

The track means 16 comprises a pair of upwardly open U-shaped channels 30 and 32 for movably supporting the carriage means 17 between the frames. The respective ends of the tracks 30 and 32 are rigidly secured to the depending edge portion of the respective frame panel 26. Respective end portions of the tracks are transversely interconnected by brace members 34.

Angular brace members 36 transversely secured rigidly to the inner surface of the respective track end portion support a length of dimension lumber between the tracks and the brace members 36 to add rigidity to the track means 16.

The carriage means 17 includes a horizontally disposed platform means 38 which is provided with a plurality, four in the example shown, of depending wheels or rollers 40 journaled by wheel guides 42 and capable of movement along the tracks between the respective frame means 12 and 14.

Figure 2:
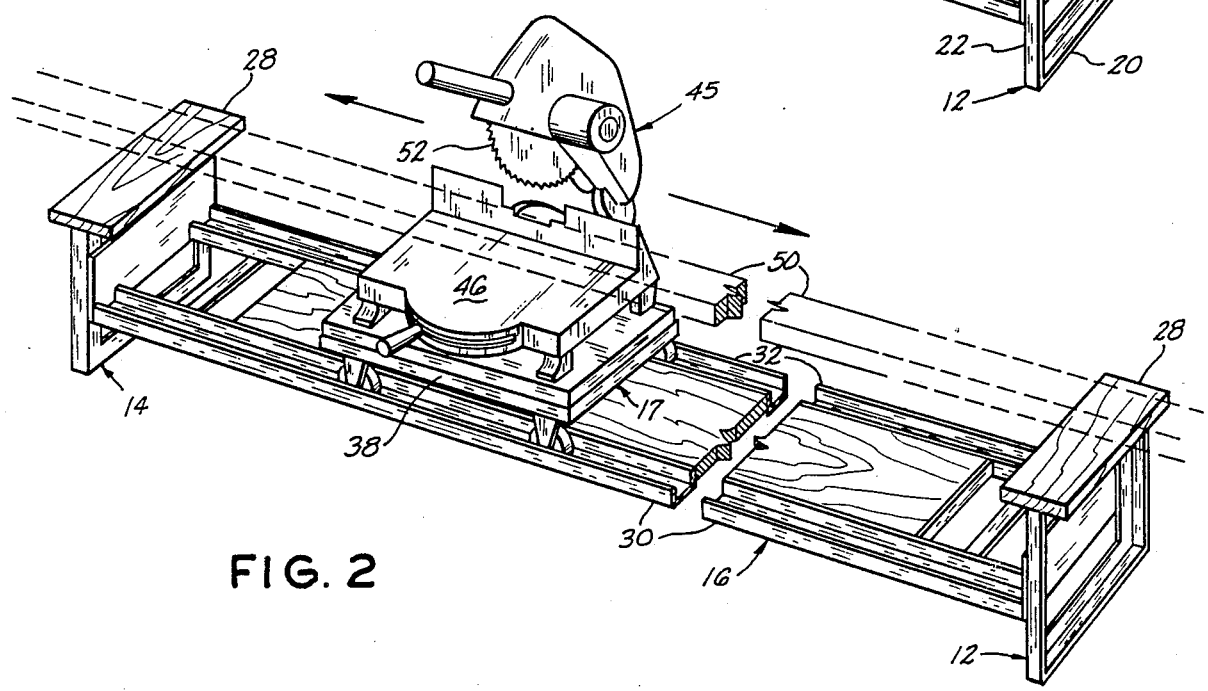

Referring also to FIG. 2, a conventional miter saw 45 is anchored on the carriage means 17 so that the workpiece supporting platform 46 of the miter saw lies in the horizontal plane common to the respective workpiece rest.

OPERATION

In operation, for convenience the relatively compact frame means 10 is preferably mounted on a support such a pair of saw horses, not shown.

A relatively long length of dimension lumber 50 is longitudinally disposed on the frame rests 28 and the carriage 17 is manually moved toward a respective end portion of the frame for conventional operation of the miter saw blade 52 on the workpiece.

Obviously the miter saw 45 may be positioned toward either of the frame means 12 or 14 and one end portion of the workpiece 50 positioned on the miter saw work table 46 with the other end portion of the workpiece 50 supported by a remote workpiece rest 28.

Obviously the invention is susceptible to changes or alterations without defeating its practicability. Therefore, I do not wish to be confined to the preferred embodiment shown in the drawings and described herein.

I claim:

1. An elongated workpiece support, comprising:

a pair of spaced-apart upright parallel frames;

a workpiece rest horizontally supported by the upper limit of each frame of said pair of frames;

tracks extending between and horizontally supported by said pair of frames;

carriage means supported by said tracks for reciprocable movement between said frames; and, a workpiece processing tool means supported by said carriage means for processing a workpiece when extending between and supported by said workpiece rests.

2. The workpiece support according to claim 1 in which the track means comprises:

a pair of U-shaped channels having the legs defining the U-shape disposed upwardly.

3. The workpiece support according to claim 2 in which said carriage means includes:

a platform horizontally overlying said track means; and, a plurality of wheel means depending from and supporting said platform.

* * * * *